United States Patent
Konno (10) Patent No.: US 7,393,487 B2
(45) Date of Patent: Jul. 1, 2008

(54) METHOD OF MOLDING SYNTHETIC RESIN GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 635 days.

(21) Appl. No.: 11/043,816

(22) Filed: Jan. 26, 2005

(65) Prior Publication Data

US 2005/0200044 A1 Sep. 15, 2005

Related U.S. Application Data

(62) Division of application No. 10/226,900, filed on Aug. 23, 2002, now abandoned.

(30) Foreign Application Priority Data

Sep. 11, 2001 (JP) ............................. 2001-275680

(51) Int. Cl.
*B29C 45/16* (2006.01)
*B29C 45/37* (2006.01)
(52) U.S. Cl. .................. 264/250; 264/328.12
(58) Field of Classification Search ................ 264/250, 264/328.12, 328.18
See application file for complete search history.

(56) References Cited

U.S. PATENT DOCUMENTS

| 3,679,119 | A | * | 7/1972 | Copping ..................... 229/400 |
| 4,802,045 | A | * | 1/1989 | Yamamoto et al. .......... 360/132 |
| 4,832,664 | A | * | 5/1989 | Groger et al. ............... 474/111 |
| 4,840,553 | A | * | 6/1989 | Arai ......................... 425/129.1 |
| 6,086,498 | A | * | 7/2000 | Hashimoto ................. 474/111 |
| 6,634,974 | B2 | * | 10/2003 | Fujiwara et al. ............. 474/111 |
| 6,890,277 | B2 | * | 5/2005 | Inoue et al. ................. 474/111 |
| 7,026,377 | B1 | * | 4/2006 | Grant ......................... 523/200 |

FOREIGN PATENT DOCUMENTS

| FR | 2736123 | * | 1/1997 |
| JP | 7-16876 | * | 1/1995 |
| JP | 10-103435 | * | 4/1998 |
| JP | 10-213192 | * | 8/1998 |

OTHER PUBLICATIONS

Menges, Georg et al., How to Make Injection Molds, 3rd edition, Hanser Publishers, 2001, pp. 163-164 and 169-183.*

* cited by examiner

*Primary Examiner*—Jill L. Heitbrink
(74) *Attorney, Agent, or Firm*—Howson & Howson LLP (57) ABSTRACT

A synthetic resin guide for a transmission device comprises an elongated rail for longitudinal sliding engagement with a power transmission medium, and a rail supporting member molded as a unit with the rail. The supporting member comprises a plurality of reinforcing ribs which support the rail. The ribs are distributed along the length of the transmission device from a location adjacent one end of the rail to a location adjacent the opposite end of the rail. The guide is formed by injection molding and the reinforcing ribs extend in directions following the flow of synthetic resin during injection molding. Preferably the synthetic resin is a glass fiber reinforced resin. By forming the reinforcing ribs in this manner, high strength and toughness are imparted to the guide, and warpage and torsion, which would otherwise be encountered in a high temperature transmission environment, are reduced.

12 Claims, 9 Drawing Sheets

METHOD OF MOLDING SYNTHETIC RESIN GUIDE FOR TRANSMISSION DEVICE

CROSS-REFERENCE TO RELATED APPLICATION

This application is a division of application Ser. No. 10/226,900, filed Aug. 23, 2002, now abandoned.

FIELD OF THE INVENTION

This invention relates to guides for sliding engagement with chains, belts and other power transmission media such as those used in a motor vehicle engine or the like for transmitting power from a driving sprocket or pulley to a driven sprocket or pulley. These guides may be fixed guides, or movable guides associated with tensioners. More specifically, the invention relates to improvements in guides formed of synthetic resins.

BACKGROUND OF THE INVENTION

In general, in a transmission device for a motor vehicle engine or the like, in which mechanical power is transmitted by a medium such as a chain, belt or the like, a movable or fixed guide is attached to a body frame, such as an engine block wall, by a mounting bolt, a pin or the like. The chain, belt, or other power transmission medium, travels in sliding contact with the guide.

In the case of a movable guide, which may be in the form of a tension lever or the like, the guide provides the power transmission medium with appropriate tension to prevent transmission failure resulting from excessive stretching, or excessive loosening, of the power transmission medium. A fixed guide, such as a guide rail or the like, limits the power transmission medium to a predetermined traveling path to prevent vibration noise, side vibration, and disengagement.

Figure 13:
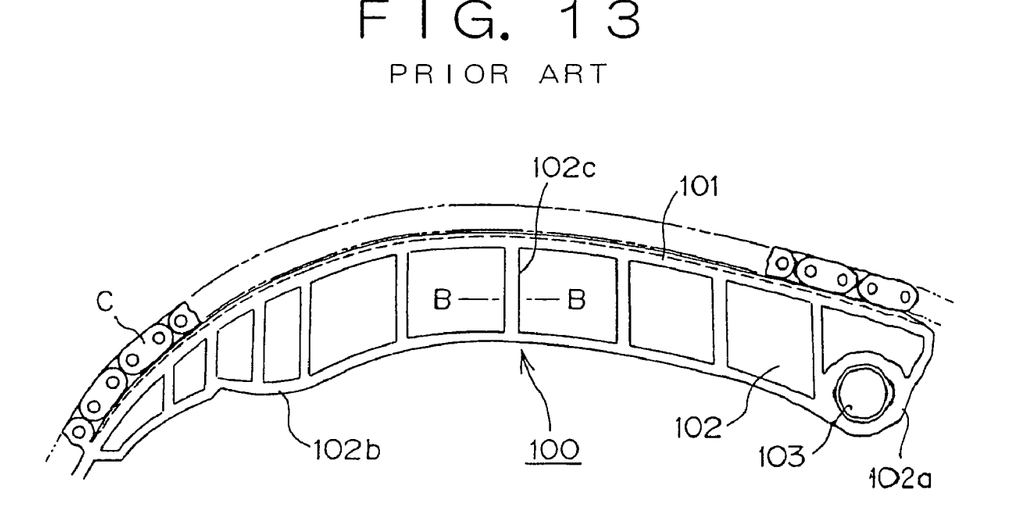
FIG. 13 is a view illustrating an example of a conventional synthetic resin guide for a transmission device.

FIG. 13 illustrates an example of a conventional synthetic resin guide 100 for a tensioner lever. The guide 100 comprises a slide rail 101, which is in sliding contact with a traveling chain C, and a rail-supporting member 102 provided on the back side of the slide rail 101. The rail supporting member 102 includes a boss 102a having a mounting hole 103 for pivoting attachment to an engine block wall. The rail supporting member also includes a tensioner abutting portion 102b, which cooperates with a tensioner (not shown) for providing appropriate tension to prevent transmission failure resulting from excessive stretching, or excessive loosening, of the chain. The synthetic resin guide 100 includes a plurality of thick reinforcing ribs 102c, each formed at suitable intervals along the rail supporting member 102, to enhance the mechanical properties and toughness of the guide 100.

Figure 14:
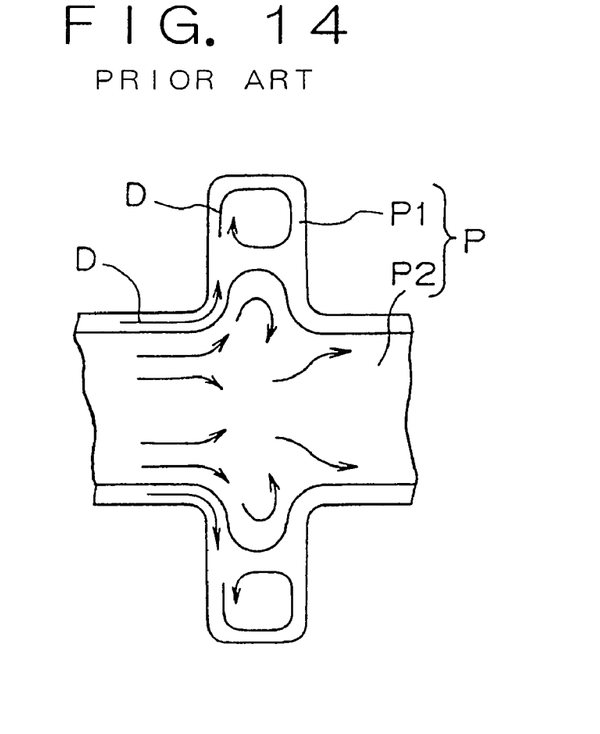
FIG. 14 is a cross-sectional view taken on plane B-B in FIG. 13.

The conventional synthetic resin guide 100 has several problems preventing it from exhibiting good mechanical properties and toughness. When the guide is injection-molded from an injection gate provided on one end portion of the guide, the reinforcing ribs 102c extend substantially perpendicular to the direction of injection of the synthetic resin P. As a result of the orientation of the reinforcing ribs, the flow of the injected synthetic resin P, which, as shown in FIG. 14, comprises a skin layer-forming resin P1 and a core layer-forming resin P2, exhibits a stagnant fluid state within and around the interior of the reinforcing ribs 102c. The residence, eddy flow, and turbulent flow of the resin P prevent the resin from achieving a strain-free molecular orientation in the interior of the reinforcing ribs 102c. Consequently, the peripheral portions of the ribs are solidified in an strained state. The orientation strain not only causes cracks due to loading during power transmission, but also causes thermal shrinkage resulting from a non-crystalline region in the synthetic resin P. Accordingly, strains such as warpage, torsion and the like occur in a high temperature environment such as in an automobile engine, and the guiding function is not entirely satisfactory.

Figure 15:
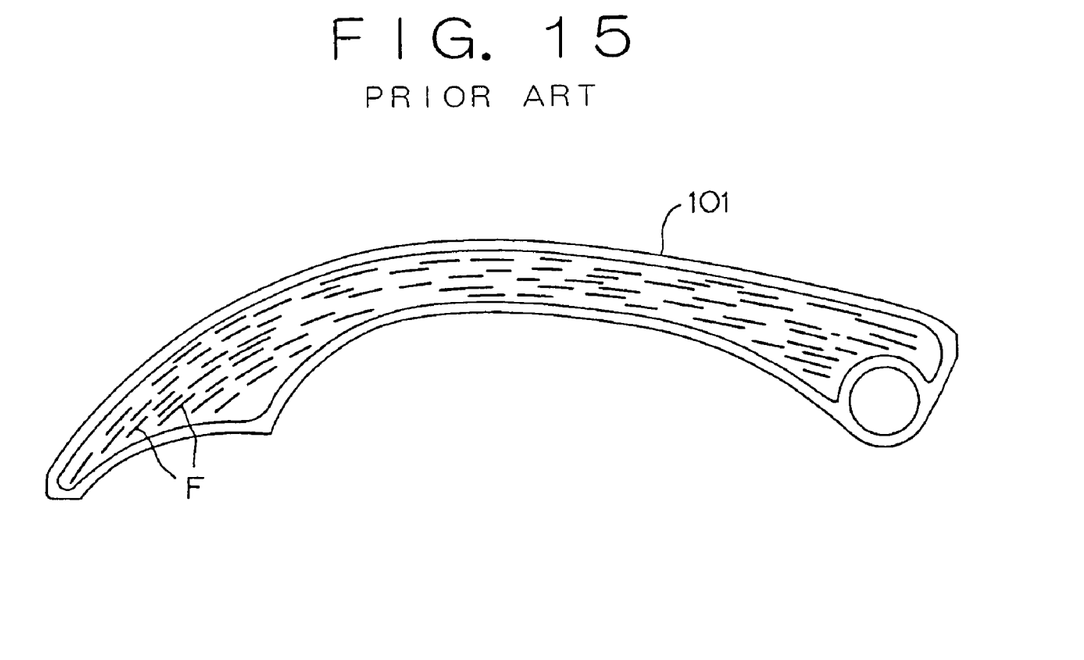
FIG. 15 is a view showing the ideal orientation of glass fibers in a guide.
Figure 16:
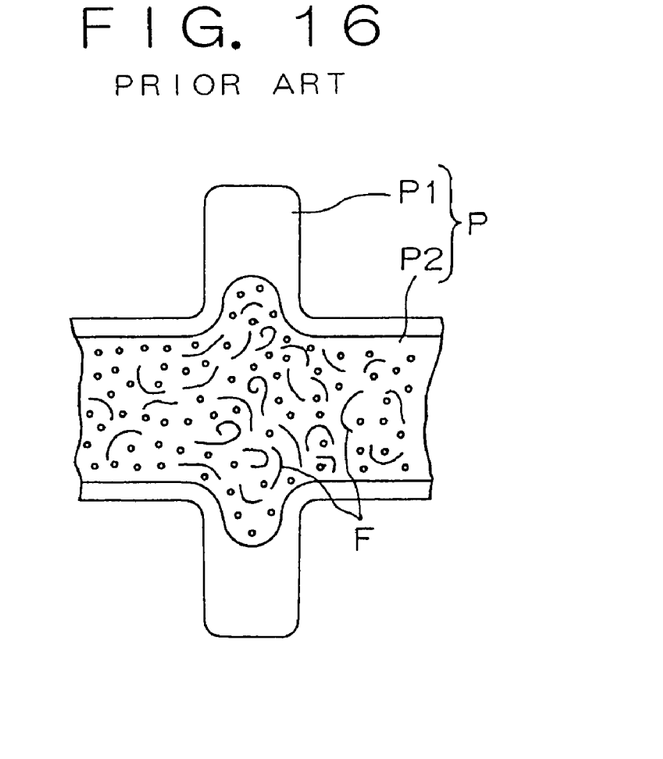
FIG. 16 a cross-sectional view taken on plane B-B in FIG. 13 illustrating a case in which a glass fiber reinforcing resin was used.

Referring to FIGS. 15 and 16, when a synthetic resin P, composed of a glass fiber reinforced resin (consisting of a skin layer forming resin P1 and a core layer forming resin P2) is used, ideal mechanical properties and toughness are exhibited when the reinforcing glass fibers F contained in the core layer forming resin are oriented in a direction substantially parallel to the slide rail 101. However, as described above, since the reinforcing rib portions 102c extend substantially perpendicular to the direction of injection of the synthetic resin P, the resin is in a stagnant fluid state in the interiors of the respective reinforcing ribs 102c, and in the peripheral portions thereof. Residence, eddy flow, turbulent flow and the like are generated in the fluid resin, and, as a result, as shown in FIG. 16, the orientation of the glass fibers is disturbed. Thus, in spite of the mixing of glass fibers F in the synthetic resin P to increase the strength of the guide, ideal strength cannot be achieved.

Furthermore, since the reinforcing rib portions 102c impair the flow of the glass fiber-reinforced synthetic resin P, moldability during injection molding is unsatisfactory. Thus, glass fibers F cannot be dispersed in such a way that they are oriented in a specified direction, and cannot be mixed uniformly in the resin. To solve this problem, changing the injection conditions has been tried. However, a higher injection pressure and a longer injection time are required, thereby increasing the cost of injection molding.

Accordingly, objects of the invention are to solve the above-mentioned problems encountered in the prior art, and to provide a synthetic resin guide for a transmission device including reinforcing portions, which exhibits greater strength and toughness, and in which strains such as warpage, torsion and the like in a high temperature environment are significantly reduced.

The synthetic resin guide in accordance with the invention comprises an elongated rail for longitudinal sliding engagement with a power transmission medium, and a rail supporting member molded as a unit with the rail. The supporting member comprises a plurality of reinforcing ribs which support the rail. These ribs are distributed along the length of the transmission device from a location adjacent one end of the rail to a location adjacent the opposite end of the rail. The guide is formed by injection molding, and, in order to achieve the above-mentioned objects, the reinforcing ribs extend in directions such that the flow of synthetic resin during injection molding substantially follows the longitudinal directions of the reinforcing ribs. Preferably, the synthetic resin is a glass fiber reinforced resin. The synthetic resin guide in accordance with the invention, may be either a fixed guide or a movable guide.

In order for the reinforcing ribs to extend in a direction following the flow of resin during injection molding, any arrangement such as an S-shaped arrangement, a curved arrangement, a truss-shaped arrangement, a vein-shaped arrangement, a honeycomb-shaped arrangement, or the like, may be used.

The injection molding process used to produce the synthetic resin guide according to the invention can be an injection molding process in which resin processing is integrally carried out from one end portion in a longitudinal direction of the guide toward the other end portion. For example, any process such as a typical injection molding process using a single synthetic resin, a two-color injection molding process using two kinds of synthetic resins, a sandwich injection molding process in which a core layer resin is injected inside a skin layer, or the like, may be used.

According to the invention the reinforcing rib portions which supports the slide rail extend in directions following the flow of synthetic resin during injection molding of the guide. Thus the reinforcing rib portions behave as auxiliary flow paths, which lead the synthetic resin injected during the injection molding of the guide from one end portion in a longitudinal direction of the guide toward the other end portion, so that injected synthetic resin flows throughout the guide without significant flow resistance, so that the injected synthetic resin flows smoothly to the end of the synthetic resin guide.

Since the synthetic resin is fully molecularly-oriented when solidified, the crystal region of the synthetic resin is increased and thermal shrinkage of the guide is reduced. Furthermore, the pressure required for injection molding of the guide can be reduced to a lower level than in the conventional case, and the injection time can also be reduced.

DETAILED DESCRIPTION OF THE PREFERRED EMBODIMENTS

Preferred embodiments of a synthetic resin transmission device guide according to the invention for a (hereinafter referred to as a transmission guide) will be described below with reference to the drawings.

Figure 1:
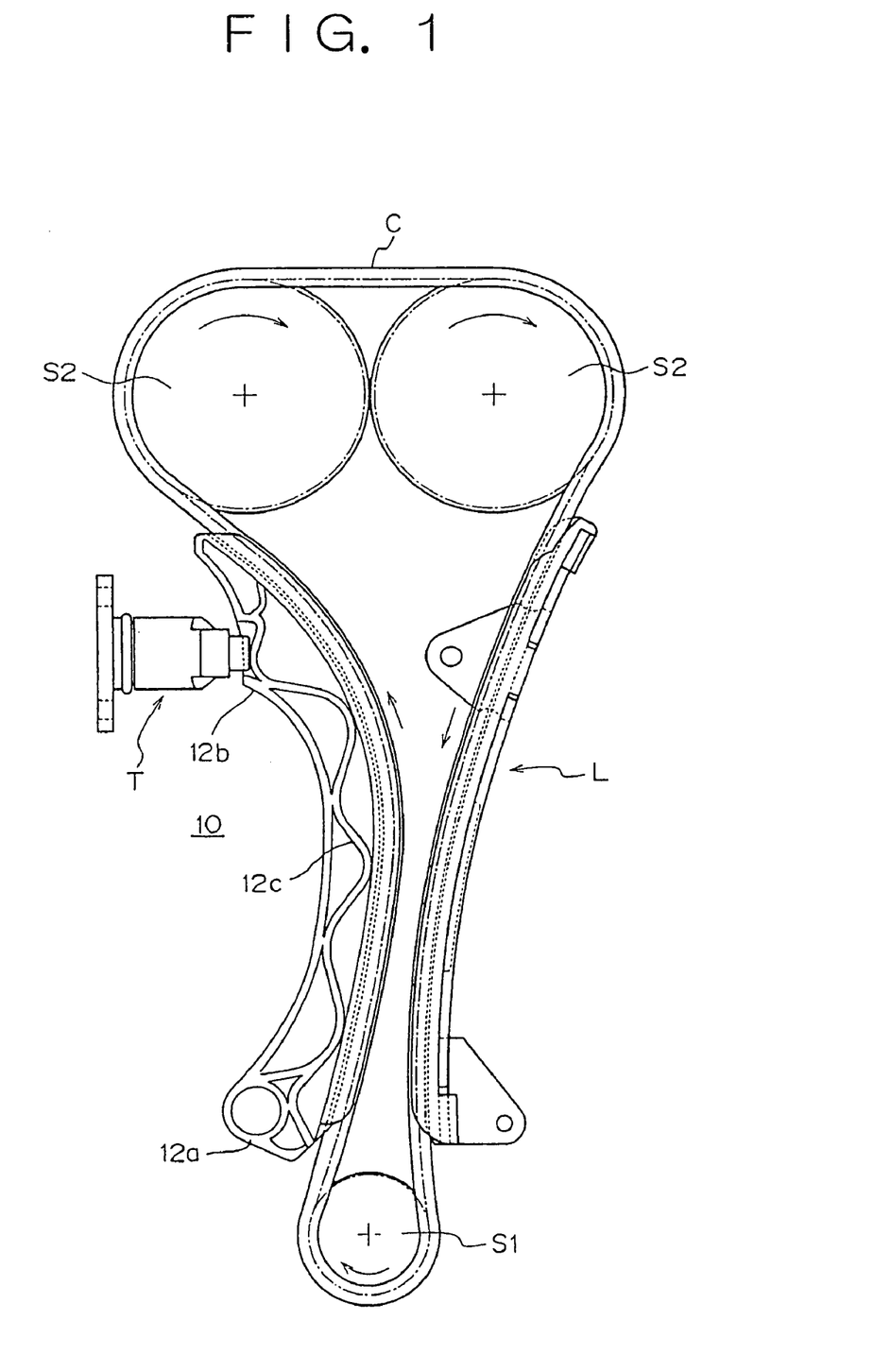
FIG. 1 is a front elevational view illustrating a transmission guide in accordance with the invention in use in a motor vehicle engine.

As shown in FIG. 1, a transmission, for valve timing in a motor vehicle engine, transmits power by means of a chain C, which travels around a driving sprocket S1 and driven sprockets S2 in a circulating path. A movable transmission guide 10 guides, and applies tension to, the chain C, as the chain slides on the guide. A fixed guide L, along which the chain slides, is also provided. However, unlike the transmission guide 10, the fixed guide does not have a reinforcing rib portion.

Figure 2:
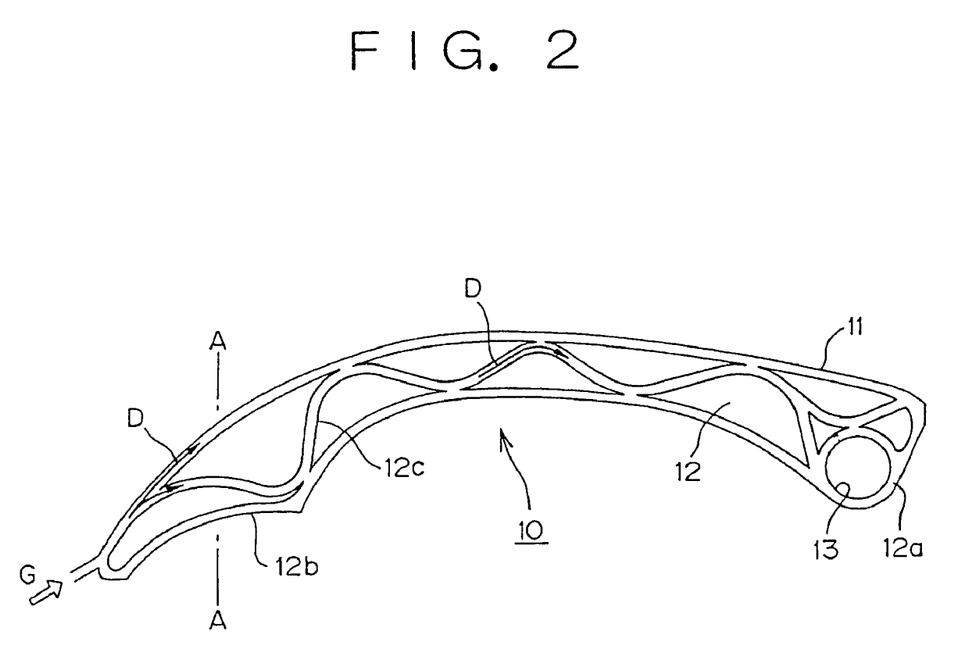
FIG. 2 is a schematic elevational illustrating the flow of resin during injection molding of a guide in accordance with the invention.

As shown in FIG. 2, the transmission guide comprises a slide rail 11, having on one side a substantially arc-shaped sliding contact surface on which a chain C slides, and, on its opposite side, a rail supporting member 12, which extends in perpendicular relationship to the sliding contact surface, along the length of the guide. The rail supporting member 12 includes a boss 12a having a mounting hole 13, for pivotally mounting the guide on a wall of an engine block so that it can serve as a movable guide, and portion 12b for abutting a tensioner T (FIG. 1), in order to apply appropriate tension to the chain C to prevent transmission failure resulting from excessive stretching or loosening of the chain. The guide also has reinforcing rib portions 12c which serve both a reinforcing and weight-reducing function.

The slide rail 11 and rail supporting member 12 are integrally molded as a unit by injection molding. A synthetic resin P is injected through a gate G, provided at one end in the longitudinal direction of the guide. The reinforcing rib portions 12c extend in an S-shaped configuration, to correspond to the direction of injection of the synthetic resin P. Consequently, the synthetic resin P, injected through the gate G, flows to the reinforcing rib portions 12c along an auxiliary flow path as shown by arrows D in FIG. 2, so that the resin is injected into the entire guide with a minimum of flow resistance. The resin P does not remain stationary at the reinforcing rib portions 12c during injection molding, and no eddy flow or turbulent flow occurs. Consequently, the synthetic resin P can be injected smoothly to the end of the guide opposite the gate G. As a result, the synthetic resin P is molecularly oriented when it is solidified.

The transmission guide 10 thus obtained has an increased crystal region of injection-molded synthetic resin P, and accordingly, the strength and toughness of the guide are dramatically improved. Further, because the crystal region is increased, thermal shrinkage of the guide is reduced, strains such as warpage, torsion and the like are less likely to occur even in a high temperature transmission environment, and a stable transmission guiding function can be achieved.

Figure 3:
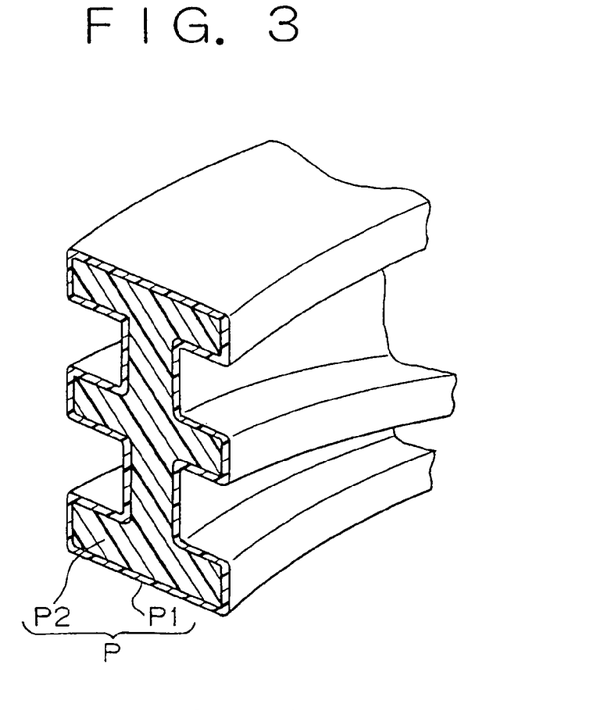
FIG. 3 is a cross-sectional view of a reinforcing rib taken on plane A-A in FIG. 2.

As illustrated in FIG. 3, a sandwich injection molding process may be used to form the transmission guide. In sandwich injection molding, a resin P2, which forms a core layer, is injected into the interior of a sheath composed of a resin P1, which forms a skin layer. As shown, the core layer is injected into the interior of the reinforcing rib portions 12c. Since the injection ratio of the core layer forming resin P2 can be increased, the strength and toughness of the guide can be improved.

Figure 4:
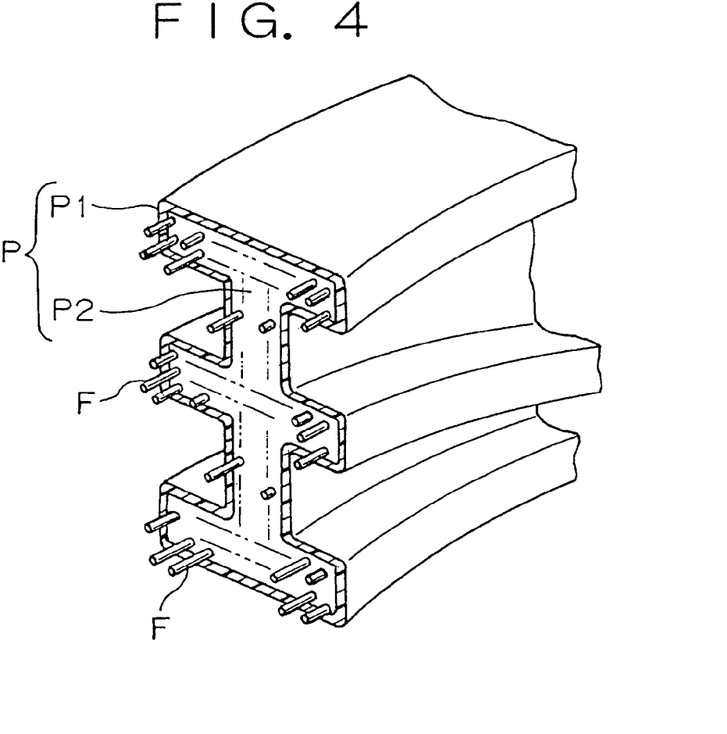
FIG. 4 is a cross-sectional view corresponding to FIG. 3, but illustrating a case in which a glass fiber reinforcing resin is used.
Figure 5:
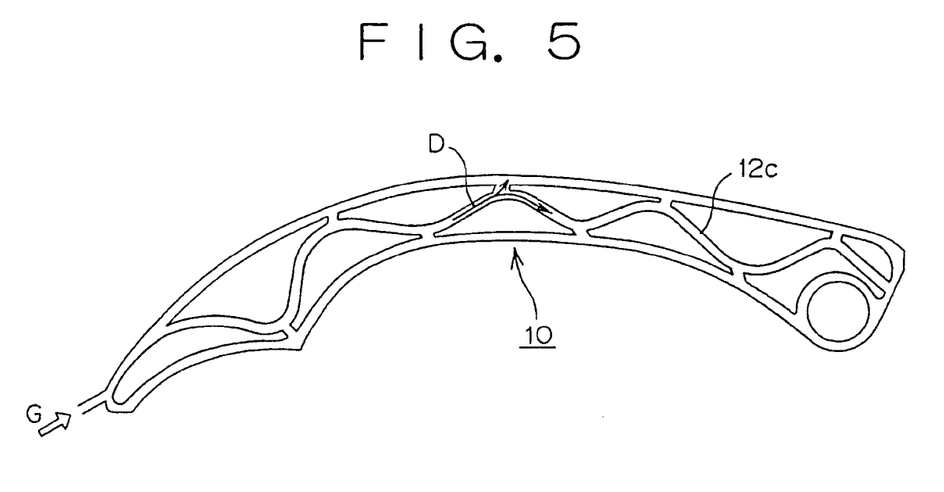
FIG. 5 is a schematic elevational view showing the relationship between an S-shaped reinforcing rib and the flow of resin.

When the core layer resin P2 consists of a glass fiber reinforced resin, the reinforcing glass fibers F are uniformly dispersed in the resin and oriented in the injection direction (the direction of the normal to the a cross section in FIG. 4). With the use of glass fibers, the strength and toughness of the guide can be further enhanced.

The transmission guide 10 can be produced by a conventional injection molding apparatus, except that the mold is shaped so that the reinforcing ribs follow the direction of injection of the synthetic resin P during injection molding.

The synthetic resins P, used for the transmission guide 10 are not particularly limited, and any one of the synthetic resins, which have been used in the injection molding, such as nylon 6, nylon 66, nylon 46, all aromatic nylons and the like, may be used.

Although the reinforcing ribs 12c in the above example are in the form of an S-shaped curve substantially following the injection direction of the synthetic resin P, the reinforcing ribs can be arranged in various other forms, as shown in FIGS. 5 to 12.

Figure 6:
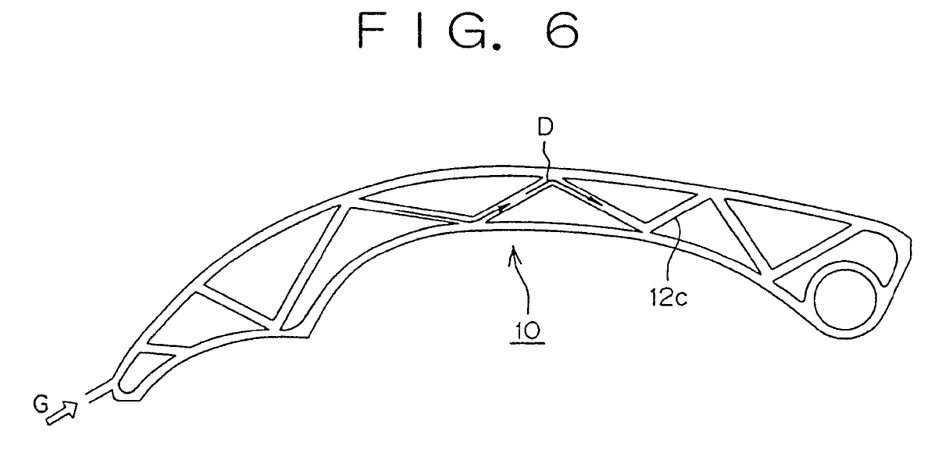
FIG. 6 is a schematic elevational view showing the relationship between a truss-shaped reinforcing rib and the flow of resin.

By adopting an arrangement in which the reinforcing ribs form a plurality of connected triangles, as shown in FIG. 6, a truss-shaped arrangement is achieved. Inner stress, generated when the guide 10 is under load, can be balanced, and its bending strength and toughness can be enhanced.

Figure 7:
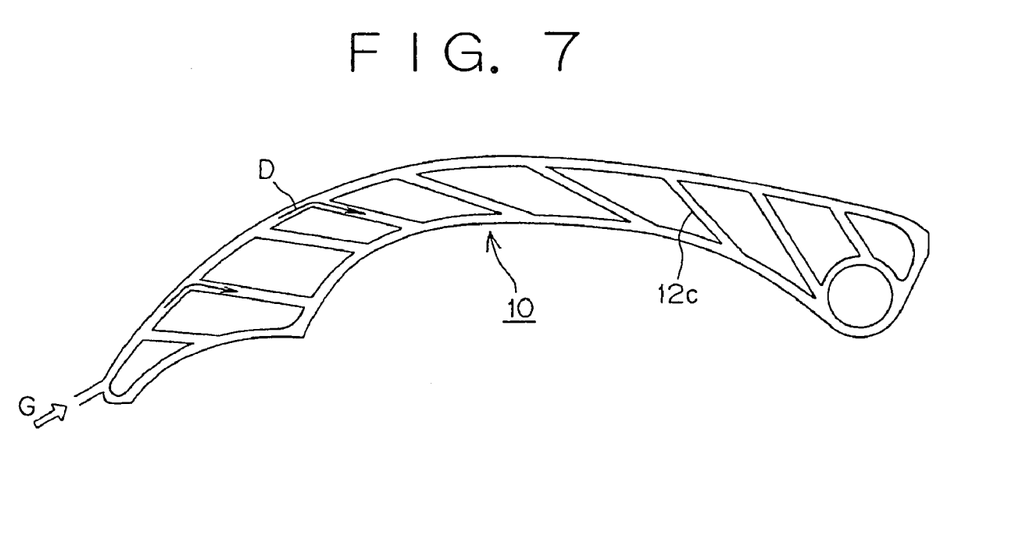
FIG. 7 is a schematic elevational view showing the relationship between radial, linear, reinforcing ribs and the flow of resin.
Figure 8:
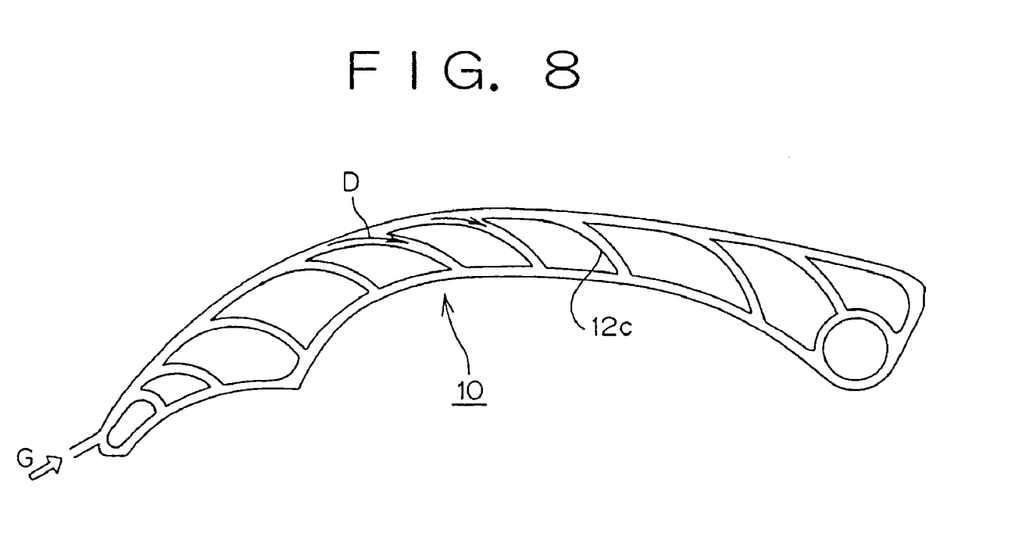
FIG. 8 is a schematic elevational view showing the relationship between radial, curved, reinforcing ribs and the flow of resin.

As shown in FIGS. 7 and 8, a plurality of reinforcing ribs 12c are disposed in a radiating pattern which begins at the slide rail, which is at the outer end of the radiating pattern. The radiating ribs extend along the direction of flow of the synthetic resin P. A resulting enhanced fluidity of the resin during injection molding contributes to a reduction in injection pressure and a reduction in injection time.

Figure 9:
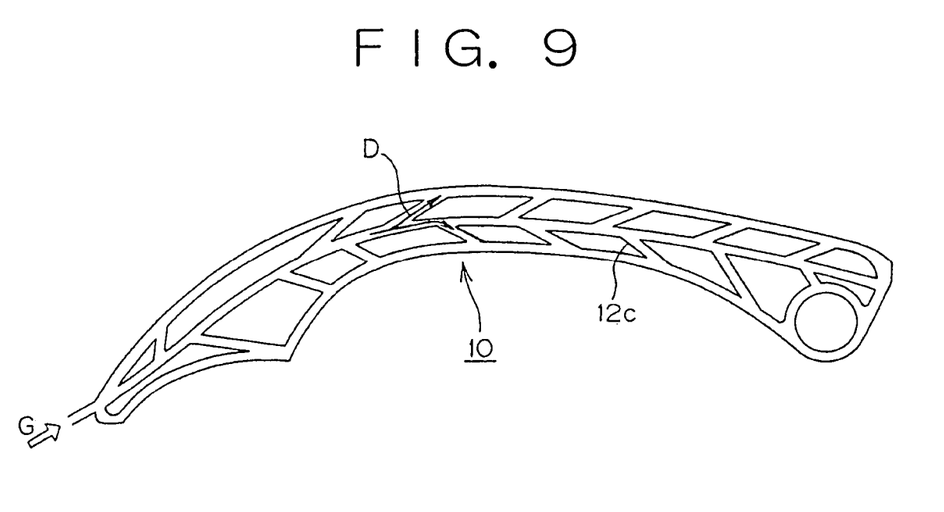
FIG. 9 is a schematic elevational view showing the relationship between linear, vein-shaped, reinforcing ribs and the flow of resin.
Figure 10:
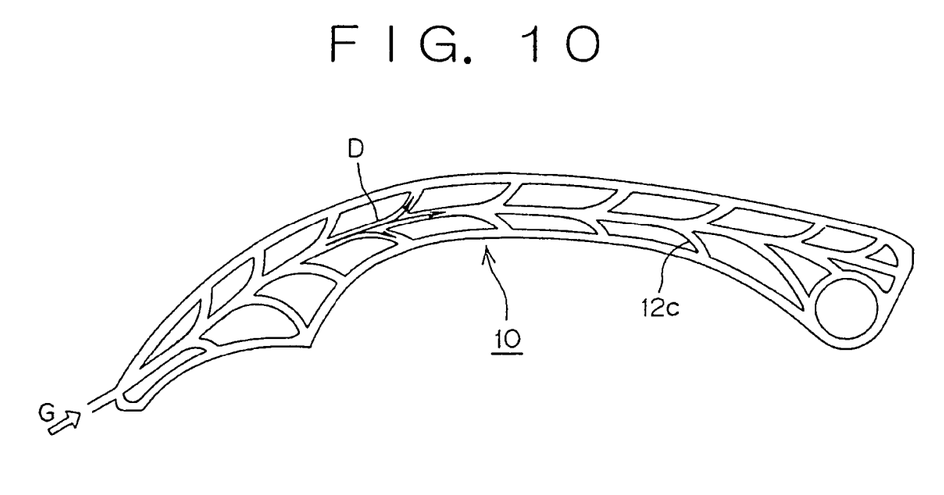
FIG. 10 is a schematic elevational view showing a relationship between curved, vein-shaped, curve reinforcing ribs and the flow of resin.

As shown in FIGS. 9 and 10, a plurality of reinforcing ribs 12c extend in a vein-shaped arrangement. These ribs extend outwardly from a central rib which extends longitudinally in a direction substantially parallel to the slide rail. The synthetic resin P can be injected uniformly into the entire guide, since the flow of resin follows the directions of the ribs during injection molding. In these embodiments, the bending strength and toughness of the guide are further enhanced.

Figure 11:
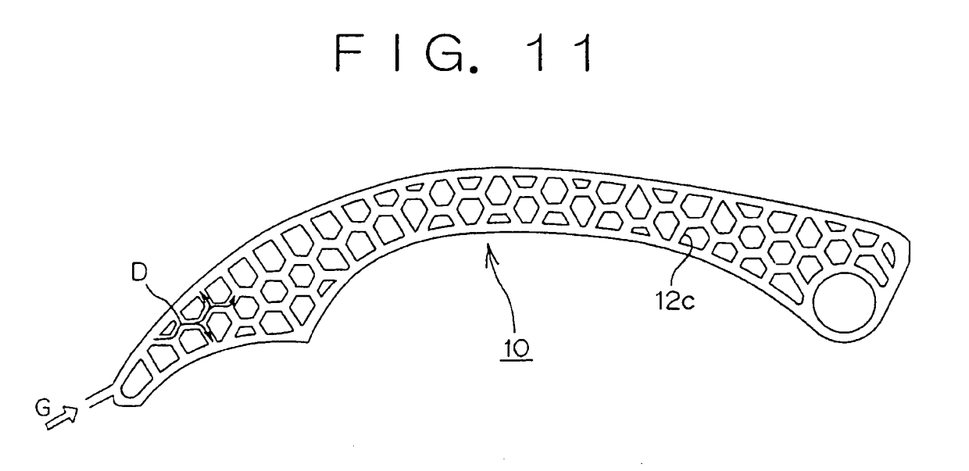
FIG. 11 is a schematic elevational view showing the relationship between honeycomb-shaped reinforcing ribs and the flow of resin.
Figure 12:
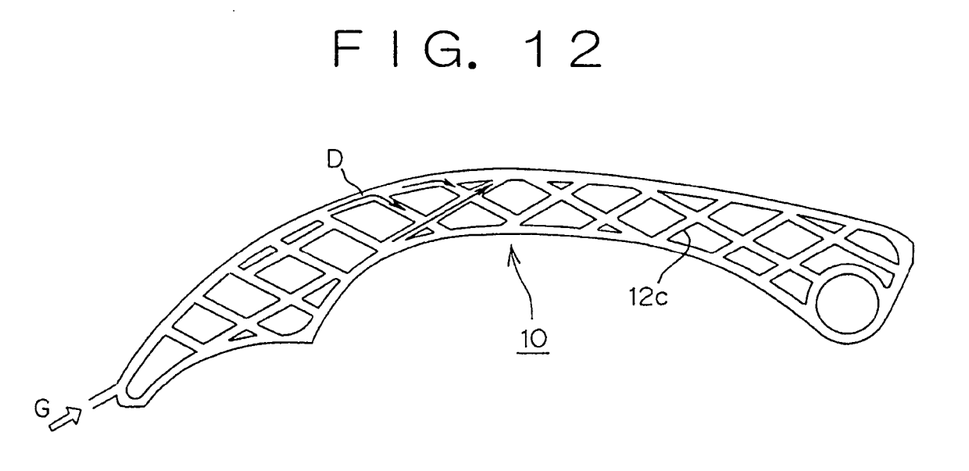
FIG. 12 is a schematic elevational view showing the relationship between reinforcing ribs formed in a number-sign pattern and the flow of resin.

As shown in FIGS. 11 and 12, reinforcing ribs 12c are disposed in a honeycomb-shaped arrangement or a number sign- or pound sign-shaped arrangement. Here again, the flow of resin during injection molding follows the directions of the ribs, and the strength of the guide is enhanced.

In accordance with the invention, the reinforcing ribs of a slide rail supporting member extend in a direction such that the flow of synthetic resin P during injection molding follows the longitudinal directions of the ribs. Thus, the resin is molecularly oriented when it is solidified in such a way that the strength and toughness of the guide are dramatically improved. Furthermore, the crystal region of the resin injected into the guide is increased so that thermal shrinkage of the guide is decreased, and warpage, torsion and the like are reduced, even in a high temperature environment, and a stable guiding function is achieved. The injection pressure and injection time are also reduced, and a the production cost of the guide can be significantly reduced.

When the synthetic resin is a glass fiber-reinforcing resin, the orientation of the glass fibers F in the longitudinal direction of reinforcing ribs can be enhanced significantly, and a more uniform dispersion of the reinforcing glass fibers can be achieved. As a result, the strength of the guide can be significantly increased.

I claim:

1. A method of manufacturing a synthetic resin guide for an endless, flexible, power transmission medium, said guide comprising an elongated rail having an elongated surface on one side thereof, said surface having a gradual convex curvature in a plane in which the direction of its elongation lies, and facing in a first direction for sliding engagement with said power transmission medium, and an elongated rail support fixed to the opposite side of said rail, said rail support extending along said opposite side of the rail in the direction of elongation thereof, and also extending away from said rail in a direction opposite to said first direction, the method comprising:

injecting resin into a mold cavity having an elongated shape corresponding to the shape of the guide to be produced, and thereby forming a unitary molded structure comprising both said rail and said rail support, the rail support comprising an elongated portion extending along the length of the guide and spaced from the rail, and a web connecting the rail to said elongated portion, the web being narrower than the rail and the elongated portion and extending substantially the entire length of the guide;

during the injection of resin into the mold cavity, forming a reinforcing rib on said web by causing said resin to flow into a rib-shaped portion of said mold cavity along a continuously curved undulating path that is alternately tangent to portions of the mold cavity in which said rail and said elongated portion are formed; and throughout the injection of resin into the mold cavity, maintaining substantially laminar flow of resin in said mold cavity;

whereby eddy currents and turbulent flow in said resin, and stagnant resin in a fluid state, are avoided, and said resin has a substantially strain-free molecular orientation when solidified.

2. A method according to claim 1, in which said mold cavity has opposite ends spaced from each other along the direction of elongation of the mold cavity, and in which the resin is injected into the mold cavity entirely at one of said opposite ends thereof.

3. A method according to claim 1, in which the guide is formed by sandwich molding, in which injection of resin is carried out by injection of two kinds of resin, one forming a core of the guide, and the other forming a skin layer enclosing said core.

4. A method according to claim 1, in which the guide is formed by sandwich molding, in which injection of resin is carried out by injection of a first resin containing glass fibers, said first resin forming a core of the guide, and another resin, free of glass fibers, forming a skin layer enclosing said core.

5. A method of manufacturing a synthetic resin guide for an endless, flexible, power transmission medium, said guide comprising an elongated rail having an elongated surface on one side thereof, said surface having a gradual convex curvature in a plane in which the direction of its elongation lies, and facing in a first direction for sliding engagement with said power transmission medium, and an elongated rail support fixed to the opposite side of said rail, said rail support extending along said opposite side of the rail in the direction of elongation thereof, and also extending away from said rail in a direction opposite to said first direction, the rail support comprising a web extending in perpendicular relationship to the rail, and reinforcing ribs formed on both sides of the web, the method comprising:

injecting resin into a mold cavity having an elongated shape corresponding to the shape of the guide to be produced, and thereby forming a unitary molded structure comprising both said rail and said rail support;

during the injection of resin into the mold cavity, forming the web and reinforcing ribs of said rail support by causing said resin to flow into rib-shaped portions of said mold cavity, along a continuously curved, undulating path that is tangent, at multiple locations, to the portion of the mold cavity in which the rail is formed ; and throughout the injection of resin into the mold cavity, maintaining laminar flow of resin along the lengths of said ribs on both sides of said web;

whereby eddy currents and turbulent flow in said resin, and stagnant resin in a fluid state, are avoided, and said resin has a substantially strain-free molecular orientation when solidified.

6. A method according to claim 5, in which said mold cavity has opposite ends spaced from each other along the direction of elongation of the mold cavity, and in which the resin is injected into the mold cavity entirely at one of said opposite ends thereof.

7. A method according to claim 5, in which the guide is formed by sandwich molding, in which injection of resin is carried out by injection of two kinds of resin, one forming a core of the guide, and the other forming a skin layer enclosing said core.

8. A method according to claim 5, in which the guide is formed by sandwich molding, in which injection of resin is carried out by injection of a first resin containing glass fibers, said first resin forming a core of the guide, and another resin, free of glass fibers, forming a skin layer enclosing said core.

9. A method of manufacturing a synthetic resin guide for an endless, flexible, power transmission medium, said guide comprising an elongated rail having an elongated surface on one side thereof, said surface having a gradual convex curvature in a plane in which the direction of its elongation lies, and facing in a first direction for sliding engagement with said power transmission medium, and an elongated rail support fixed to the opposite side of said rail, said rail support extending along said opposite side of the rail in the direction of elongation thereof, and also extending away from said rail in a direction opposite to said first direction, the rail support comprising a web extending in perpendicular relationship to the rail, and a reinforcing rib formed on at least one side of the web, the method comprising:

injecting resin into a mold cavity having an elongated shape corresponding to the shape of the guide to be produced, and thereby forming a unitary molded structure comprising both said rail and said rail support;

during the injection of resin into the mold cavity, forming the web and said reinforcing rib of said rail support by causing said resin to flow into a rib-shaped portion of said mold cavity, along a continuously curved, undulating path that is tangent, at multiple locations, to the portion of the mold cavity in which the rail is formed; and throughout the injection of resin into the mold cavity, maintaining laminar flow of resin along the length of said rib;

whereby eddy currents and turbulent flow in said resin, and stagnant resin in a fluid state, are avoided, and said resin has a substantially strain-free molecular orientation when solidified.

10. A method according to claim 9, in which said mold cavity has opposite ends spaced from each other along the direction of elongation of the mold cavity, and in which the resin is injected into the mold cavity entirely at one of said opposite ends thereof.

11. A method according to claim 9, in which the guide is formed by sandwich molding, in which injection of resin is carried out by injection of two kinds of resin, one forming a core of the guide, and the other forming a skin layer enclosing said core.

12. A method according to claim 9, in which the guide is formed by sandwich molding, in which injection of resin is carried out by injection of a first resin containing glass fibers, said first resin forming a core of the guide, and another resin, free of glass fibers, forming a skin layer enclosing said core.

\* \* \* \* \*